United States Patent
Jo et al.

(10) Patent No.: US 12,127,003 B2
(45) Date of Patent: *Oct. 22, 2024

(54) METHOD AND APPARATUS FOR PROCESSING DATA UNITS IN WIRELESS COMMUNICATION SYSTEM

(71) Applicant: LG ELECTRONICS INC., Seoul (KR)

(72) Inventors: Geumsan Jo, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,031

(22) Filed: Jul. 21, 2023

(65) Prior Publication Data

US 2023/0370845 A1    Nov. 16, 2023

Related U.S. Application Data

(63) Continuation of application No. 16/970,767, filed as application No. PCT/KR2019/010429 on Aug. 16, 2019, now Pat. No. 11,758,402.

(30) Foreign Application Priority Data

Sep. 27, 2018   (KR) ........................ 10-2018-0114645

(51) Int. Cl.
*H04W 12/06*   (2021.01)
*H04L 47/32*   (2022.01)
(Continued)

(52) U.S. Cl.
CPC ........... *H04W 12/106* (2021.01); *H04L 47/32* (2013.01); *H04L 47/34* (2013.01); *H04W 8/04* (2013.01); *H04W 28/06* (2013.01); *H04W 80/02* (2013.01)

(58) Field of Classification Search
CPC .... H04W 12/106; H04W 80/02; H04L 47/32; H04L 47/34
See application file for complete search history.

(56) References Cited

U.S. PATENT DOCUMENTS 11,516,142 B2 * 11/2022 Zheng ..................... H04L 47/34
2016/0302075 A1 * 10/2016 Dudda ................ H04W 12/106
(Continued)

OTHER PUBLICATIONS

Nathalie Haziza et al., 'Multi-technology Vehicular Cooperative System Based on Software Defined Radio (SDR)', In: International Workshop on Communication Technologies for Vehicles, Nets4Cars/Nets4Trains 2013 (14 Pages).
(Continued)

*Primary Examiner* — Fahmida S Chowdhury
(74) *Attorney, Agent, or Firm* — BRYAN CAVE LEIGHTON PAISNER LLP

(57) ABSTRACT

The present invention relates to a method for processing data units by a Packet Data Convergence Protocol (PDCP) entity of a user equipment (UE) in a wireless communication system. In particular, the method includes the steps of: receiving a first data unit having a specific count value from a lower layer; and discarding the first data unit, when there is a second data unit having the specific count value which was received before the first data unit and for which an integrity verification was successful.

10 Claims, 6 Drawing Sheets

(51) Int. Cl.
  *H04L 47/34*     (2022.01)
  *H04W 8/04*      (2009.01)
  *H04W 12/106*    (2021.01)
  *H04W 28/06*     (2009.01)
  *H04W 80/02*     (2009.01)

(56) References Cited

U.S. PATENT DOCUMENTS

| | | |
|---|---|---|
| 2017/0245252 A1 | 8/2017 | Gao et al. |
| 2018/0083688 A1 | 3/2018 | Agiwal et al. |
| 2018/0132128 A1* | 5/2018 | Koskinen ............... H04L 47/365 |
| 2018/0270668 A1* | 9/2018 | Nair ...................... H04W 76/10 |
| 2018/0368018 A1* | 12/2018 | Kim ....................... H04L 69/08 |
| 2019/0053099 A1* | 2/2019 | Kim ...................... H04W 76/27 |
| 2019/0090156 A1* | 3/2019 | Kim ........................ H04L 67/12 |
| 2020/0205003 A1* | 6/2020 | Ingale ................... H04W 12/04 |
| 2021/0100063 A1* | 4/2021 | Sharma ................. H04W 76/16 |

OTHER PUBLICATIONS

3GPP TS 36.323 V15.0.0, GRAN; 3rd Generation Partnership Project: Technical Specification Group Radio Access Network; Evolved Universal Terrestrial Radio Access; (E-UTRA); Packet Data Convergence Protocol (PDCP) specification (Release 15) Jul. 2018 (53 Pages).

* cited by examiner

[Fig. 1]
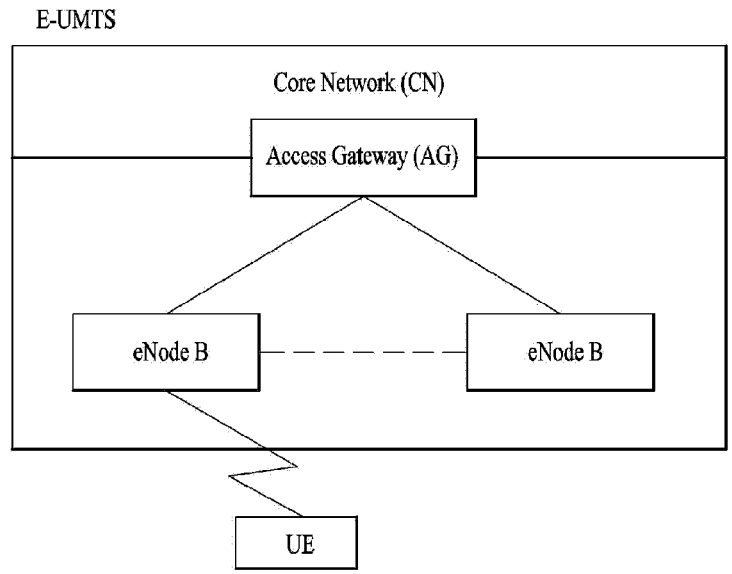
[Fig. 2]
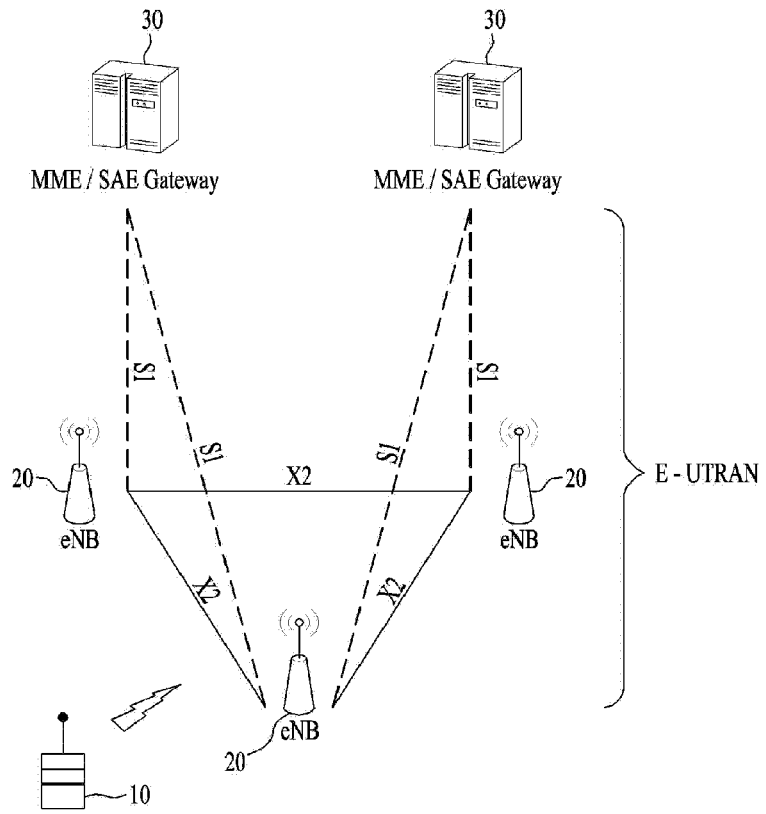

[Fig. 3]
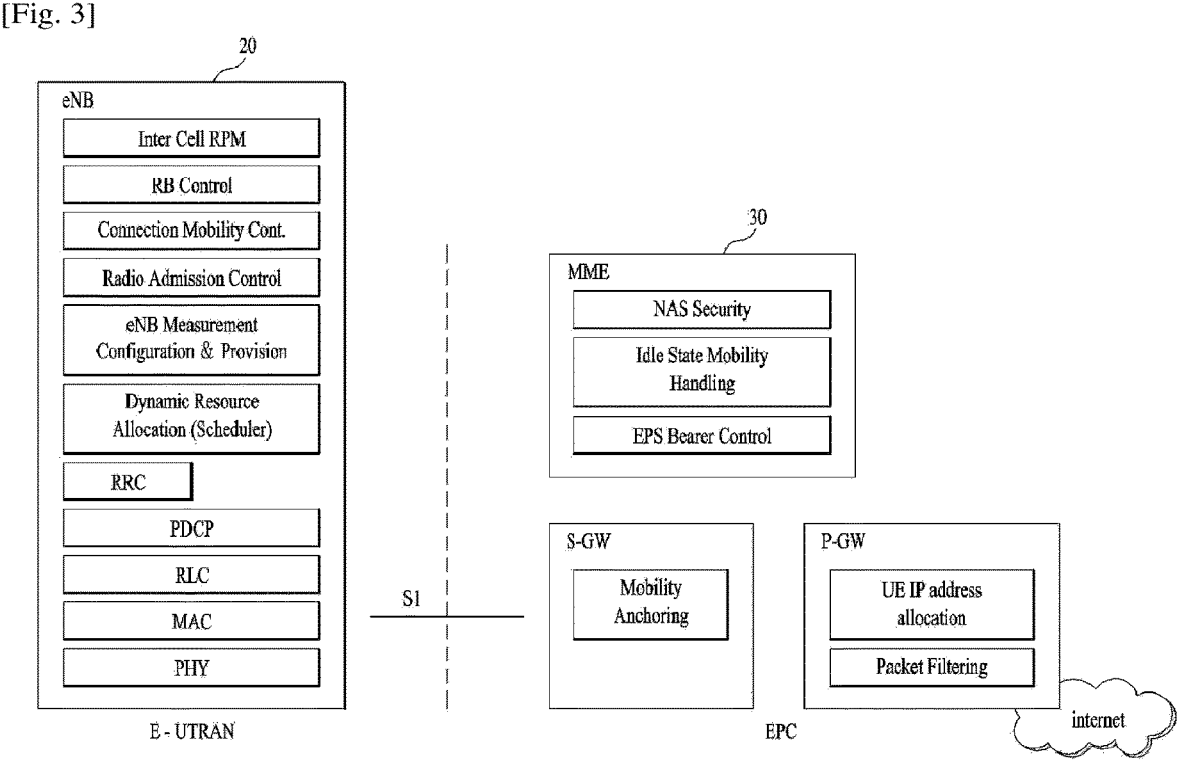

[Fig. 4]
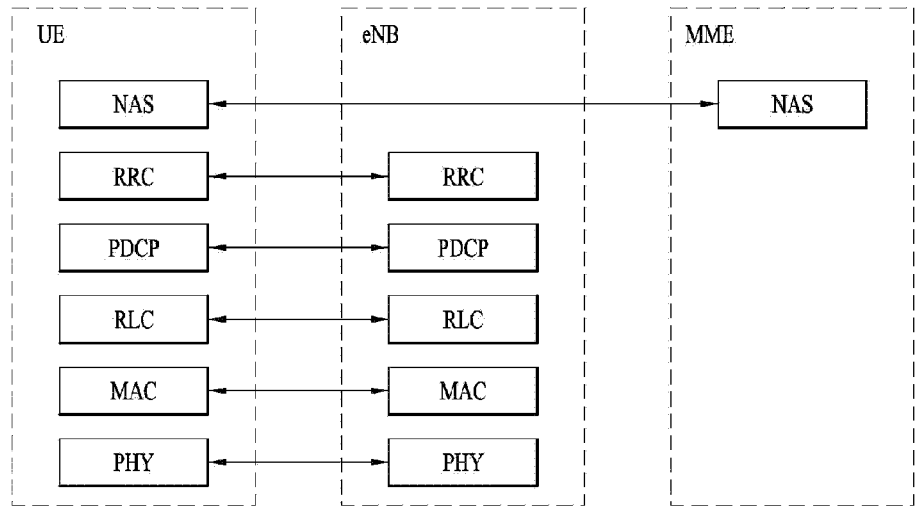
(a) Control-Plane Protocol Stack
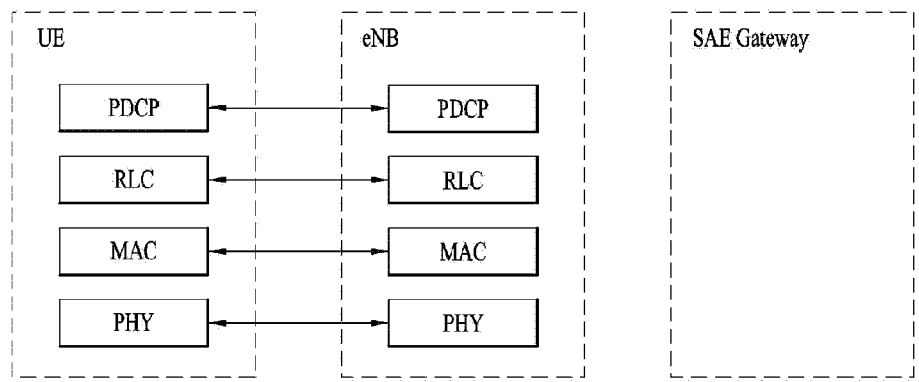
(b) User-Plane Protocol Stack
[Fig. 5]
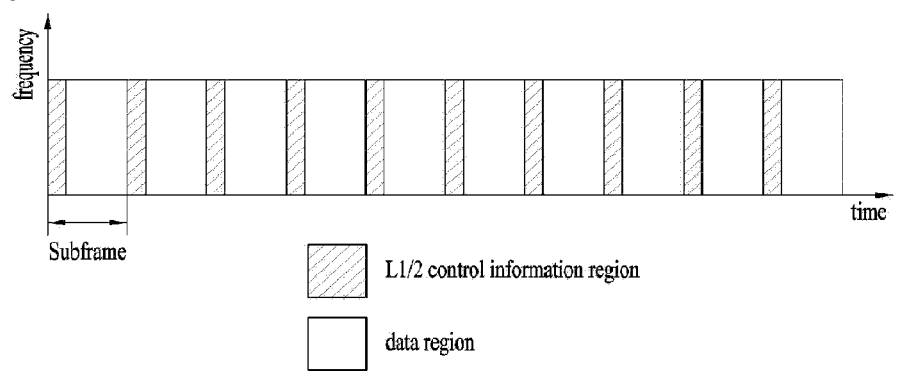

[Fig. 6]
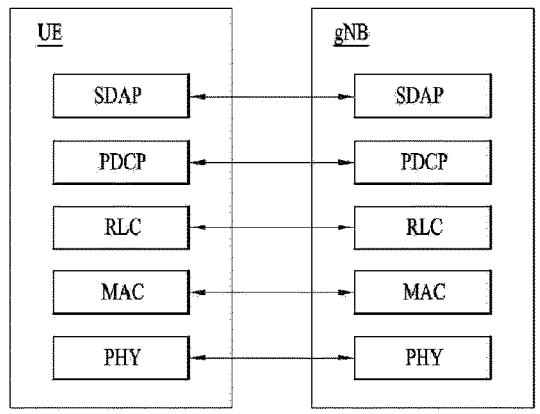
(a)
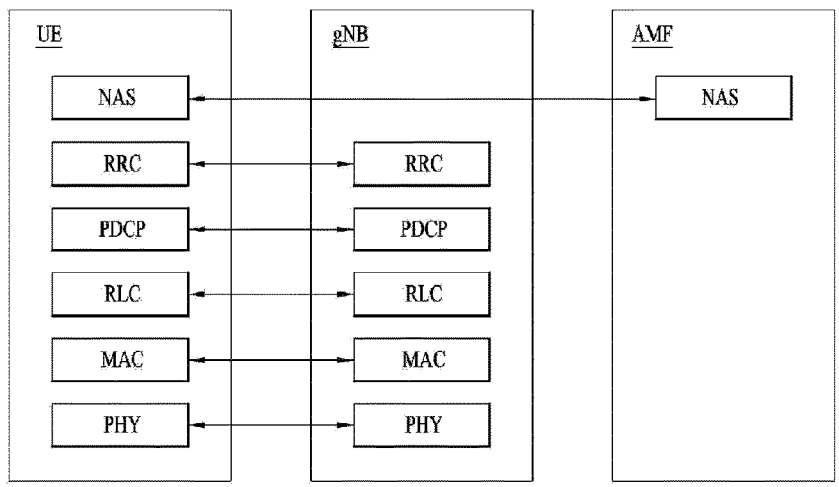
(b)
[Fig. 7]
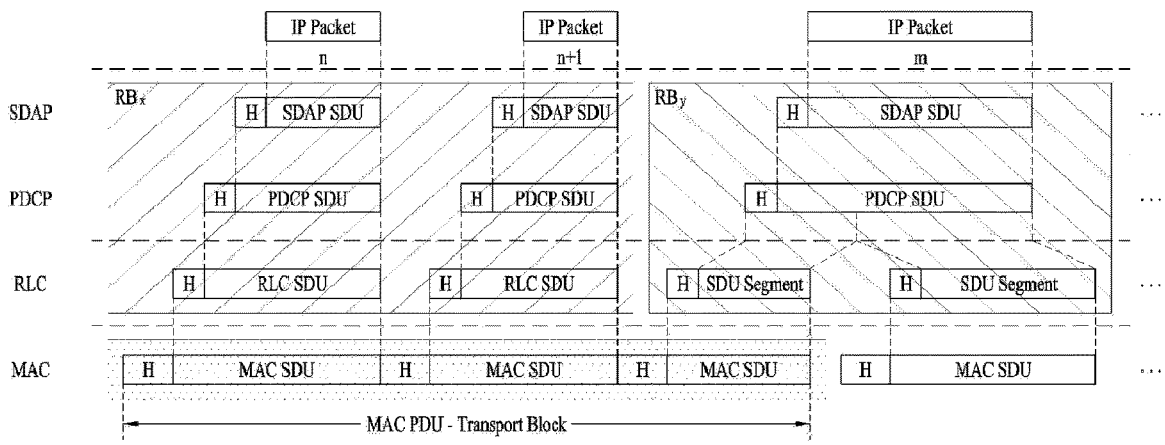

[Fig. 8]
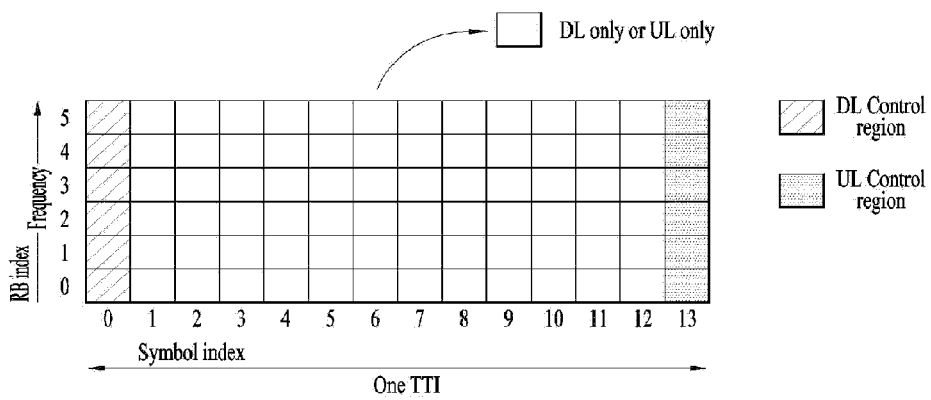
[Fig. 9]
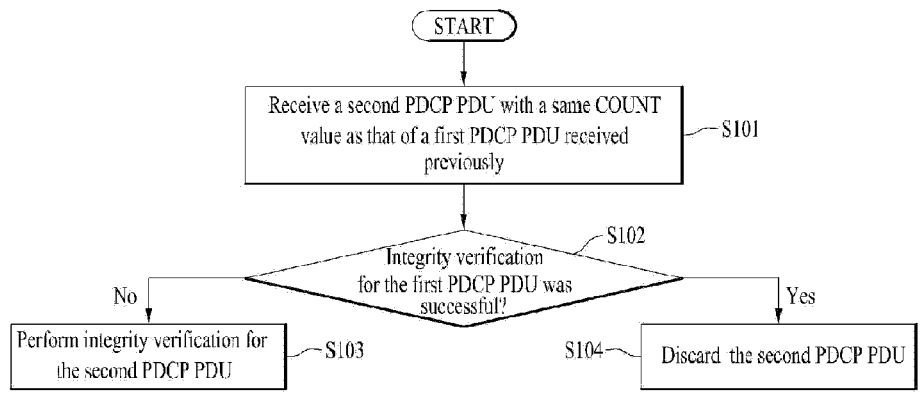

[Fig. 10]
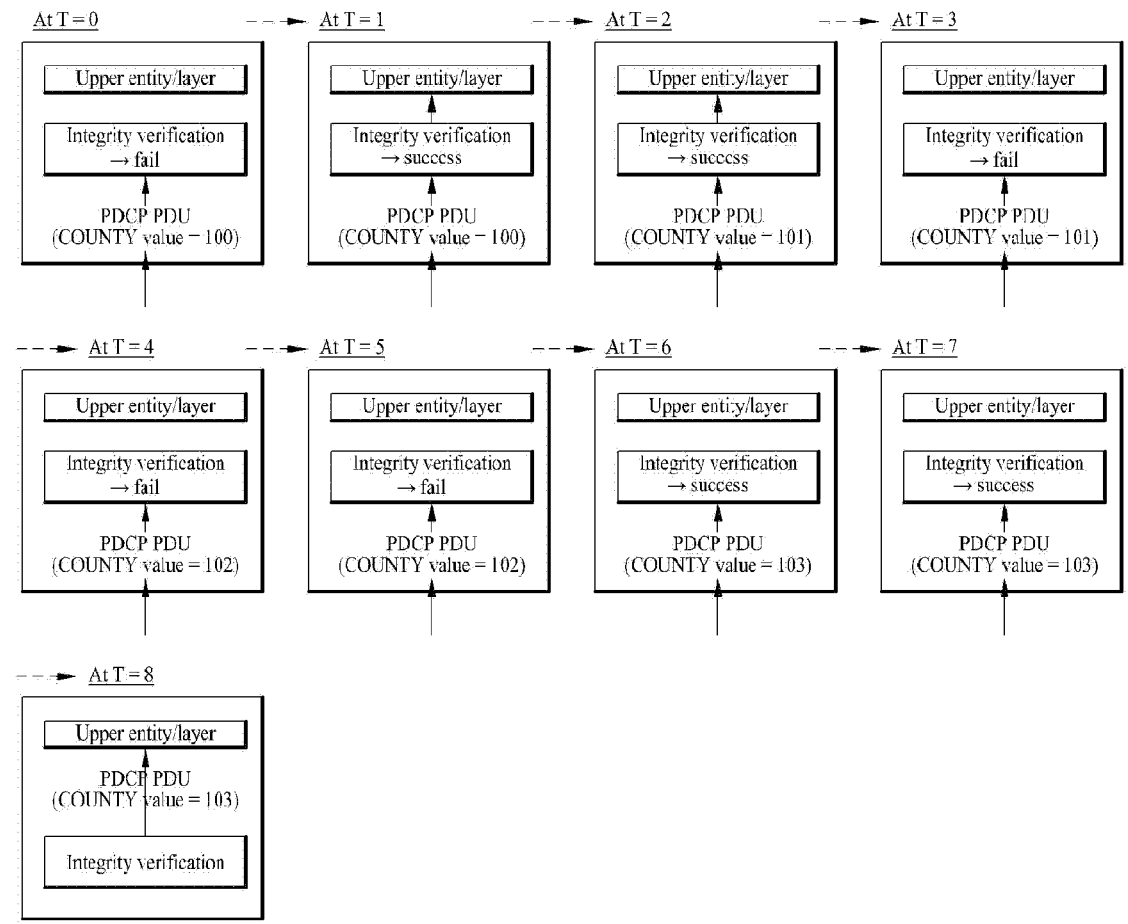
[Fig. 11]
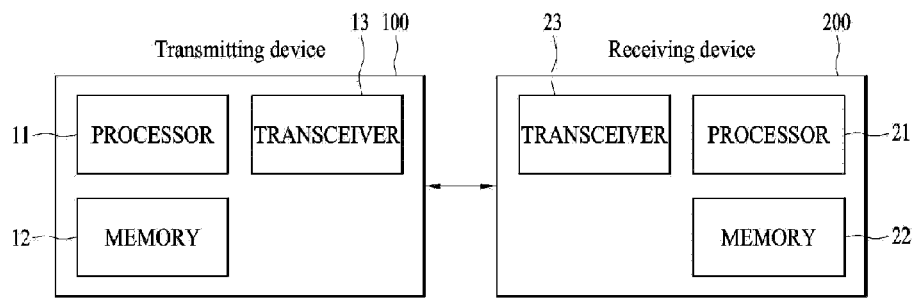

METHOD AND APPARATUS FOR PROCESSING DATA UNITS IN WIRELESS COMMUNICATION SYSTEM

This application is a Continuation Application of U.S. patent application Ser. No. 16/970,767, filed on Aug. 18, 2020, which is a National Stage of International Application No. PCT/KR2019/010429, filed on Aug. 16, 2019 which claims the benefit of Korean Application No. 10-2018-0114645, filed on Sep. 27, 2018 the contents of which are all hereby incorporated by reference herein in their entirety.

TECHNICAL FIELD

The present invention relates to a wireless communication system. Especially, the present invention relates to processing data units by a Packet Data Convergence Protocol (PDCP) entity of a user equipment in a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information. In particular, overcoming delay or latency has become an important challenge in applications whose performance critically depends on delay/latency.

DISCLOSURE OF INVENTION

Technical Problem

Accordingly, an object of the present invention is to provide a method of processing data units by a Packet Data Convergence Protocol (PDCP) entity of a user equipment in a wireless communication system and apparatus therefore.

Solution to Problem

The object of the present invention can be achieved by the method of processing data units by a Packet Data Convergence Protocol (PDCP) entity of a user equipment (UE) in a wireless communication system, the method comprising: receiving a first data unit having a specific count value from a lower layer; and discarding the first data unit, when there is a second data unit having the specific count value which was received before the first data unit and for which an integrity verification was successful.

Further, it is suggested a user equipment (UE) in a wireless communication system comprising a memory; and at least one processor coupled to the memory. More specifically, the at least one processor controls a Packet Data Convergence Protocol (PDCP) entity of the UE to receive a first data unit having a specific count value from a lower layer; and discard the first data unit, when there is a second data unit having the specific count value which was received before the first data unit and for which an integrity verification was successful.

Preferably, the UE (i.e., the PDCP entity of the UE) should perform an integrity verification for the first data unit; and store the first data unit in a buffer, when integrity verification for the first data unit is successful and when the integrity verification for the second data unit was not successful. More preferably, the UE (i.e., the PDCP entity of the UE) should discard the first data unit when integrity verification for the first data unit is not successful.

Preferably, the UE (i.e., the PDCP entity of the UE) should determine whether the first data unit is to be discarded or not based on a result of the integrity verification for the first data unit, when there is a second data unit having the specific count value which was received before the first data unit and for which an integrity verification is not successful.

Preferably, the at least one processor is further configured to implement at least one advanced driver assistance system (ADAS) function based on signals that control the UE.

Advantageous Effects of Invention

According to the aforementioned embodiments of the present invention, the PDCP entity of the UE can process data units efficiently.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

FIG. 1 is a diagram illustrating an example of a network structure of an evolved universal mobile telecommunication system (E-UMTS) as an exemplary radio communication system;

FIG. 2 is a block diagram illustrating an example of an evolved universal terrestrial radio access network (E-UTRAN);

FIG. 3 is a block diagram depicting an example of an architecture of a typical E-UTRAN and a typical EPC;

FIG. 4 is a diagram showing an example of a control plane and a user plane of a radio interface protocol between a UE and an E-UTRAN based on a 3GPP radio access network standard;

FIG. 5 is a diagram showing an example of a physical channel structure used in an E-UMTS system;

FIG. 6 illustrates an example of protocol stacks of a next generation wireless communication system;

FIG. 7 illustrates an example of a data flow example at a transmitting device in the NR system;

FIG. 8 illustrates an example of a slot structure available in a new radio access technology (NR);

FIG. 9 shows a flow chart of the present invention;

FIG. 10 shows an example according to an embodiment of the present invention; and FIG. 11 is a block diagram illustrating an example of elements of a transmitting device 100 and a receiving device 200 according to some implementations of the present disclosure.

BEST MODE FOR CARRYING OUT THE INVENTION

The technical objects that can be achieved through the present disclosure are not limited to what has been particularly described hereinabove and other technical objects not described herein will be more clearly understood by persons skilled in the art from the following detailed description.

FIG. 1 is a diagram illustrating an example of a network structure of an E-UMTS as an exemplary radio communication system. An Evolved Universal Mobile Telecommunications System (E-UMTS) is an advanced version of a Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information about DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information about UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, a cell refers to a prescribed geographical area to which one or more nodes provide a communication service. Accordingly, in the present disclosure, communicating with a specific cell may include communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

In some scenarios, a 3GPP based system implements a cell to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

In some scenarios, the recent 3GPP based wireless communication standard implements a cell to manage radio resources. The "cell" associated with the radio resources utilizes a combination of downlink resources and uplink resources, for example, a combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell refers to a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present disclosure, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

FIG. 2 is a block diagram illustrating an example of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipments (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

FIG. 3 is a block diagram depicting an example of an architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring cNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing an example of a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split hearers in DC and LWA hearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 5 is a diagram showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one implementation, a radio frame of 10 ms is used and one radio frame includes 10 subframes. In addition, in LTE, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a downlink shared channel (DL-SCH) which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one implementation, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receives the PDSCH indicated by B and C in the PDCCH information. In the present disclosure, a PDCCH addressed to an RNTI refers to the PDCCH being cyclic redundancy check masked (CRC-masked) with the RNTI. A UE may attempt to decode a PDCCH using the certain RNTI if the UE is monitoring a PDCCH addressed to the certain RNTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency, and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

FIG. 6 illustrates an example of protocol stacks of a next generation wireless communication system. In particular, FIG. 6(a) illustrates an example of a radio interface user plane protocol stack between a UE and a gNB and FIG. 6(b) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 6(a), the user plane protocol stack may be divided into a first layer (Layer 1) (i.e., a physical layer (PHY) layer) and a second layer (Layer 2).

Referring to FIG. 6(b), the control plane protocol stack may be divided into Layer 1 (i.e., a PHY layer), Layer 2, Layer 3 (e.g., a radio resource control (RRC) layer), and a non-access stratum (NAS) layer.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signalling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by dynamic scheduling; priority handling between logical channels of one UE by logical channel prioritization; and padding. A single MAC entity can support one or multiple numerologies and/or transmission timings, and mapping restrictions in logical channel prioritisation controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only)

of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

The main services and functions of RRC sublayer of NR include: broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

Hereinafter, 5G communication system is briefly introduced.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

FIG. 7 illustrates a data flow example at a transmitting device in the NR system.

In FIG. 7, an RB denotes a radio bearer. Referring to FIG. 7, a transport block is generated by MAC by concatenating two RLC PDUs from RBx and one RLC PDU from RBy. In FIG. 7, the two RLC PDUs from RBx each corresponds to one IP packet (n and n+1) while the RLC PDU from RBy is a segment of an IP packet (m). In NR, a RLC SDU segment can be located in the beginning part of a MAC PDU and/or in the ending part of the MAC PDU. The MAC PDU is transmitted/received using radio resources through a physical layer to/from an external device.

FIG. 8 illustrates an example of a slot structure available in a new radio access technology (NR).

To reduce or minimize data transmission latency, in a 5G new RAT, a slot structure in which a control channel and a data channel are time-division-multiplexed is considered.

In the example of FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In the example of FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 8, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire hand for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency hand in a system hand, i.e., a channel hand.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

Hereinafter, when a PDCP Data PDU is received from lower layers, actions of the receiving PDCP entity are explained. For convenience of explanation, definitions of parameter used in the actions are defined in advance.

HFN(State Variable): the HFN part (i.e. the number of most significant bits equal to HFN length) of the State Variable;

SN(State Variable): the SN part (i.e. the number of least significant bits equal to PDCP SN length) of the State Variable;

RCVD_SN: the PDCP SN of the received PDCP Data PDU, included in the PDU header;

RCVD_HFN: the HFN of the received PDCP Data PDU, calculated by the receiving PDCP entity;

RCVD_COUNT: the COUNT of the received PDCP Data PDU=[RCVD_HFN, RCVD_SN].

At reception of a PDCP Data PDU from lower layers, the receiving PDCP entity shall determine the COUNT value of the received PDCP Data PDU, i.e. RCVD_COUNT, as follows:

if RCVD_SN<SN(RX_DELIV)-Window_Size, RCVD_HFN sets to HFN(RX_DELIV)+1.

else if RCVD_SN>=SN(RX_DELIV)+Window_Size . . . RCVD_HFN sets to HFN(RX_DELIV)-1.

else, RCVD_HFN should set to HFN(RX_DELIV).

Finally, RCVD_COUNT is determined to [RCVD_HFN, RCVD_SN].

After determining the COUNT value of the received PDCP Data PDU, the receiving PDCP entity shall perform deciphering and integrity verification of the PDCP Data PDU using COUNT=RCVD_COUNT. When the integrity verification fails, the receiving PDCP entity shall indicate the integrity verification failure to upper layer and discard the PDCP Data PDU. If RCVD_COUNT<RX_DELIV or if the PDCP Data PDU with COUNT=RCVD_COUNT has been received before, the receiving PDCP entity shall discard the PDCP Data PDU.

If the received PDCP Data PDU with COUNT value=RCVD_COUNT is not discarded above, the receiving PDCP entity shall store the resulting PDCP SDU in the reception buffer.

In this case, if RCVD_COUNT>=RX_NEXT, the receiving PDCP entity shall update RX_NEXT to RCVD_COUNT+1. Further, if outOfOrderDelivery is configured, the receiving PDCP entity shall deliver the resulting PDCP SDU to upper layers.

While, if RCVD_COUNT=RX_DELIV, the receiving PDCP entity shall deliver all stored PDCP SDU(s) with consecutively associated COUNT value(s) is started from COUNT=RX_DELIV to upper layers in ascending order of the associated COUNT value after performing header decompression when not decompressed before and update RX_DELIV to the COUNT value of the first PDCP SDU which has not been delivered to upper layers, with COUNT value>RX_DELIV.

Furthermore, if t-Reordering is running, and if RX_DELIV>=RX_REORD, the receiving PDCP entity shall stop and reset t-Reordering. If t-Reordering is not running (includes the case when t-Reordering is stopped due to actions above), and RX_DELIV<RX_NEXT, the receiving PDCP entity shall update RX_REORD to RX_NEXT and start t-Reordering.

When t-Reordering expires, the receiving PDCP entity shall deliver all stored PDCP SDU(s) with associated COUNT value(s)<RX_REORD or all stored PDCP SDU(s) with consecutively associated COUNT value(s) starting from RX_REORD to upper layers in ascending order of the associated COUNT value after performing header decompression when not decompressed before. Further, the receiving PDCP entity should update RX_DELIV to the COUNT value of the first PDCP SDU which has not been delivered to upper layers, with COUNT value>=RX_REORD.

If RX_DELIV<RX_NEXT, the receiving PDCP entity should update RX_REORD to RX_NEXT and start t-Reordering.

When the value of the t-Reordering is reconfigured by upper layers while the t-Reordering is running, the UE shall update RX_REORD to RX_NEXT. Further, the UE shall stop and restart t-Reordering.

RX_NEXT indicates the COUNT value of the next PDCP SDU expected to be received. The initial value is 0.

RX_DELIV indicates the COUNT value of the first PDCP SDU not delivered to the upper layers, but still waited for. The initial value is 0.

RX_REORD indicates the COUNT value following the COUNT value associated with the PDCP Data PDU which triggered t-Reordering.

RX_NEXT, RX_DELIV and RX_REORD are the state variable.

Above three state variables are non-negative integers, and take values from 0 to $[2^{32}-1]$.

Window_Size indicates the constant size of the reordering window. The value equals to $2^{[pdep-SN-Size]}-1$.

Hereinafter, Integrity protection and verification are explained.

The integrity protection function includes both integrity protection and integrity verification and is performed in PDCP, if configured. The data unit that is integrity protected is the PDU header and the data part of the PDU before ciphering. The integrity protection is always applied to PDCP Data PDUs of SRBs. The integrity protection is applied to PDCP Data PDUs of DRBs for which integrity protection is configured. The integrity protection is not applicable to PDCP Control PDUs.

The integrity protection algorithm and key to be used by the PDCP entity are configured by upper layers. The integrity protection function is activated by upper layers. When security is activated, the integrity protection function shall be applied to all PDUs including and subsequent to the PDU indicated by upper layers for the downlink and the uplink, respectively.

For downlink and uplink integrity protection and verification, the parameters required by PDCP for integrity protection are input to the integrity protection algorithm. The required inputs to the integrity protection function include the COUNT value, and DIRECTION (direction of the transmission). The parameters required by PDCP which are provided by upper layers are:

BEARER (defined as the radio bearer identifier. It will use the value RB identity-1);

KEY (the integrity protection keys for the control plane and for the user plane are KRRCint and KUPint, respectively).

At transmission, the UE computes the value of the MAC-I field and at reception it verifies the integrity of the PDCP Data PDU by calculating the X-MAC based on the input parameters as specified above. If the calculated X-MAC corresponds to the received MAC-I, integrity protection is verified successfully.

In the NR system, even if the integrity verification for the data radio bearers (DRBs) fails, the UE does not perform a RRC Connection Re-establishment procedure. When the integrity verification for a PDCP Data PDU for DRB fails, the PDCP entity indicates the integrity verification failure and discards the PDCP Data PDU.

However, there is a case where a PDCP Data PDU is discarded even if the PDCP Data PDU can be delivered to the upper layer due to the integrity verification operation. For example, when a receiving PDCP entity receives a PDCP Data PDU, the receiving PDCP entity performs the integrity verification to the PDCP Data PDU. If the integrity verification fails, the receiving PDCP entity discards the PDCP Data PDU. After that, when the receiving PDCP entity receives a PDCP Data PDU which has the same COUNT value as the PDCP Data PDU that has failed integrity verification, the receiving PDCP entity discards the PDCP Data PDU regardless of whether the integrity verification of the PDCP Data PDU succeeds.

If this case happens, an user experience would be worsened. For example, the throughput may be decreased. Thus, a new procedure is required to handle the above case.

FIG. 9 shows a flow chart of the present invention.

Referring to FIG. 9, in S101, a receiving device (e.g., a receiving PDCP entity in the receiving device) receives a PDCP Data PDU which has the same COUNT value of a previously received PDCP Data PDU. And, in S102, the receiving device determines whether the integrity verification was successful for the previously received PDCP Data PDU or not.

If the integrity verification was failed for the previously received PDCP Data PDU, the receiving device considers that the PDCP Data PDU with the COUNT value has not been received before, and may perform the integrity verification for the PDCP Data PDU with the same COUNT value as that of the previously received PDCP Data PDU, in S103. The receiving device stores the received PDCP Data PDU in the reception buffer if the COUNT value of the PDCP Data PDU is within the reception window and the integrity verification of the PDCP Data PDU is successful.

However, if the integrity verification was successful for the previously received PDCP Data PDU, the receiving device performs the integrity verification and discards the received PDCP Data PDU in S104.

As mentioned above, after determining the COUNT value of the received PDCP Data PDU, the receiving PDCP entity shall perform deciphering and integrity verification of the PDCP Data PDU using COUNT=RCVD_COUNT. When the integrity verification fails, the receiving PDCP entity shall indicate the integrity verification failure to upper layer and discard the PDCP Data PDU.

According to the present invention, if RCVD_COUNT<RX_DELIV or if the PDCP Data PDU with COUNT=RCVD_COUNT has been received and integrity verification was successful before, the receiving PDCP entity shall discard the PDCP Data PDU. That is, a condition related to whether the integrity verification was successful before or not should be added.

Alternatively, if RCVD_COUNT<RX_DELIV or if the PDCP Data PDU with COUNT=RCVD_COUNT has been stored in the reception buffer before, the receiving PDCP entity shall discard the PDCP Data PDU This invention can be applicable to SRBs, AM DRBs, UM DRBs, and TM DRBs. The upper layer can be RRC, NAS, and SDAP. The lower layer can be RLC and MAC.

FIG. 10 shows an example according to an embodiment of the present invention. In FIG. 10, it is assumed that a receiving device (e.g., the receiving PDCP entity of the receiving device) is configured with integrity function. For example, a receiving PDCP entity at a receiving device may be configured with integrity function.

In T=0: at reception of a PDCP Data PDU (from lower layer), the receiving device shall determine the COUNT value of the received PDCP Data PDU (i.e., the COUNT value=100), and perform the deciphering and integrity verification. Since, the integrity verification in T=0 fails, the receiving device shall discard the PDCP Data PDU.

In T=1: at reception of a PDCP Data PDU (from lower layer), the receiving device shall determine the COUNT value of the received PDCP Data PDU (i.e., the COUNT value=100), and perform the deciphering and integrity verification. Since, the integrity verification in T=1 successes, the receiving device shall store the PDCP SDU in the reception buffer and deliver the PDCP Data PDU to upper layer.

In T=2: at reception of a PDCP Data PDU (via lower layer from a transmitting device), the receiving device shall determine the COUNT value of the received PDCP Data PDU (i.e., the COUNT value=101), and perform the deciphering and integrity verification. Since, the integrity verification in T=2 successes, the receiving device shall store the PDCP SDU in the reception buffer and deliver the PDCP Data PDU to upper layer.

In T=3: at reception of a PDCP Data PDU (via lower layer from a transmitting device), the receiving device shall determine the COUNT value of the received PDCP Data PDU (i.e., the COUNT value=101), and perform the deciphering and integrity verification. Since, the integrity verification in T=3 fails, the receiving device shall Indicate the integrity verification failure (to upper layer/entity above the receiving PDCP entity) and discard the PDCP Data PDU.

In T=4: at reception of a PDCP Data PDU (via lower layer from a transmitting device), the receiving device shall determine the COUNT value of the received PDCP Data PDU (i.e., the COUNT value=102), and perform the deciphering and integrity verification. Since, the integrity verification in T=4 fails, the receiving device shall Indicate the integrity verification failure (to upper layer/entity above the receiving PDCP entity) and discard the PDCP Data PDU.

In T=5: at reception of a PDCP Data PDU (via lower layer from a transmitting device), the receiving device shall determine the COUNT value of the received PDCP Data PDU (i.e., the COUNT value=102), and perform the deciphering and integrity verification. Since, the integrity verification in T=5 fails, the receiving device shall Indicate the integrity verification failure (to upper layer/entity above the receiving PDCP entity) and discard the PDCP Data PDU.

While, in T=6: at reception of a PDCP Data PDU (via lower layer from a transmitting device), the receiving device shall determine the COUNT value of the received PDCP Data PDU (i.e., the COUNT value=103), and perform the deciphering and integrity verification. Since, the integrity verification in T=6 successes, the receiving device shall store the PDCP SDU in the reception buffer and start t-Reordering.

In T=7: at reception of a PDCP Data PDU (via lower layer from a transmitting device), the receiving device shall determine the COUNT value of the received PDCP Data PDU (i.e., the COUNT value=103), and perform the deciphering and integrity verification. Since, the integrity verification in T=6 successes, the receiving device shall Discard the PDCP Data PDU.

Finally, in T=8: when t-Reordering expire, the receiving device deliver the PDCP Data PDU associated with COUNT value=103 (to upper layer/entity above the receiving PDCP entity).

FIG. 11 is a block diagram illustrating an example of elements of a transmitting device 100 and a receiving device 200 according to some implementations of the present disclosure.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present disclosure. For example, the operations occurring at the protocol stacks (e.g. PDCP, RLC, MAC and PHY layers) according to the present disclosure may be performed by the processors 11 and 21. The protocol stacks performing operations of the present disclosure may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. The present disclosure may be implemented using firmware or software, and the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include Nt (where Nt is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include Nr (where Nr is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An transceiver supporting a MIMO function of transmitting and receiving data using a plurality of antennas may be connected to two or more antennas. The transceivers 13 and 23 may be referred to as radio frequency (RF) units.

In the implementations of the present disclosure, a UE operates as the transmitting device 100 in UL and as the receiving device 200 in DL. In the implementations of the present disclosure, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present disclosure, or control the UE transceiver to receive or transmit signals according to the present disclosure. The BS processor can be configured to operate according to the present disclosure, or control the BS transceiver to receive or transmit signals according to the present disclosure.

The processor 11 (at a UE and/or at a BS) checks whether there is a UL grant or DL assignment for a serving cell in a time unit. If there is a UL grant or DL assignment for the serving cell in the time unit, the processor 11 checks whether a data unit is actually present on the UL grant or DL assignment in the time unit, in order to determine whether to restart a deactivation timer associated with the serving cell which has been started. The processor 11 restarts the deactivation timer associated with the serving cell in the time unit if there is a data unit present on the UL grant or DL assignment in the time unit. The processor 11 does not restart the deactivation timer associated with the serving cell in the time unit if there is no data unit present on the UL grant or DL assignment in the time unit, unless another condition that the processor 11 should restart the deactivation timer is satisfied. The processor 11 does not restart the deactivation timer associated with the serving cell in the time unit if there is no data unit present on the UL grant or DL assignment in the time unit and if an activation command for activating the serving cell is not present in the time unit. The processor 11 may be configured to check whether a data unit is actually present on the UL grant or DL assignment on the serving cell in the time unit in order to determine whether to restart the deactivation timer of the serving cell, if the UL grant or DL assignment is a configured grant/assignment which is configured by RRC to occur periodically on the serving cell. The processor 11 may be configured to check whether a data unit is actually present on the UL grant or DL assignment on the serving cell in the time unit in order to determine whether to restart the deactivation timer of the serving cell, if the UL grant or the DL assignment is a dynamic grant/assignment which is indicated by a PDCCH. The processor 11 may be configured to check whether a data unit is actually present on the UL grant or DL assignment on the serving cell in the time unit in order to determine whether to restart the deactivation timer of the serving cell, if the serving cell is a SCell of the UE. The processor 11 (at the UE and/or the BS) deactivates the serving cell upon expiry of the deactivation timer associated with the serving cell.

According to the present invention, when a transceiver 23 at a receiving device 200 may receive signals containing PDCP PDUs. When the processor 21 (e.g., at a PDCP entity configured in the processor 21) receives a PDCP Data PDU which has the same COUNT value of a previously received PDCP Data PDU, the processor 21 performs the integrity verification and may discard the currently received PDCP Data PDU if the integrity verification was successful for the previously received PDCP Data PDU. Else, if the integrity verification was failed for the previously received PDCP Data PDU, the processor 21 considers that the PDCP Data PDU with the COUNT value has not been received before. If the integrity verification was failed for the previously received PDCP Data PDU, the processor 21 may be configured to perform the integrity verification for the currently PDCP Data PDU with the same COUNT value. The processor 21 stores the currently received PDCP Data PDU in the reception buffer (e.g., in the memory 22) if the COUNT value of the currently received PDCP Data PDU is within the reception window and the integrity verification of the currently received PDCP Data PDU is successful.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for performing operations for a User Equipment (UE) in a wireless communication system, the method comprising:
    based on a Packet Data Convergence Protocol (PDCP) protocol data unit (PDU) being received from a lower layer, determining a COUNT value of the received PDCP PDU;
    performing an integrity verification for the received PDCP PDU based on the COUNT value;
    based on the integrity verification of the received PDCP PDU succeeding and based on at least one PDCP PDU with the COUNT value having been received before, discarding the received PDCP PDU; and
    based on the integrity verification of the received PDCP PDU failing, discarding the received PDCP PDU and considering the received PDCP PDU as not received.

2. The method of claim 1, further comprising:
    based on the received PDCP PDU being not discarded, storing a PDCP service data unit (SDU) of the first PDCP PDU in a reception buffer.

3. The method of claim 1, wherein the at least one PDCP PDU with the COUNT is a duplicated PDCP PDU of the received PDCP PDU.

4. The method of claim 1, further comprising:
    based on the integrity verification of the received PDCP PDU failing, transmitting an indication related to a failure of the integrity verification of the received PDCP PDU to an upper layer.

5. A user equipment (UE) in a wireless communication system, the UE comprising:
    at least one transceiver;
    at least one processor; and
    at least one computer memory operably connectable to the at least one processor and storing instructions that, when executed, cause the at least one processor to perform operations comprising:
    based on a Packet Data Convergence Protocol (PDCP) protocol data unit (PDU) being received from a lower layer, determining a COUNT value of the received PDCP PDU;
    performing an integrity verification for the received PDCP PDU based on the COUNT value;
    based on the integrity verification of the received PDCP PDU succeeding and based on at least one PDCP PDU with the COUNT value having been received before, discarding the received PDCP PDU; and
    based on the integrity verification of the received PDCP PDU failing, discarding the received PDCP PDU and considering the received PDCP PDU as not received.

6. The UE of claim 5, wherein the operations further comprise:
    based on the received PDCP PDU being not discarded, storing a PDCP service data unit (SDU) of the first PDCP PDU in a reception buffer.

7. The UE of claim 5, wherein the at least one PDCP PDU with the COUNT is a duplicated PDCP PDU of the received PDCP PDU.

8. The UE of claim 5, wherein the operations further comprise:
    based on the integrity verification of the received PDCP PDU failing, transmitting an indication related to a failure of the integrity verification of the received PDCP PDU to an upper layer.

9. An apparatus for a user equipment (UE), the apparatus comprising:
    at least one processor; and
    at least one computer memory operably connectable to the at least one processor and storing instructions that, when executed, cause the at least one processor to perform operations comprising:
    based on a Packet Data Convergence Protocol (PDCP) protocol data unit (PDU) being received from a lower layer, determining a COUNT value of the received PDCP PDU;

performing an integrity verification for the received PDCP PDU based on the COUNT value;

based on the integrity verification of the received PDCP PDU succeeding and based on at least one PDCP PDU with the COUNT value having been received before, discarding the received PDCP PDU; and based on the integrity verification of the received PDCP PDU failing, discarding the received PDCP PDU and considering the received PDCP PDU as not received.

10. A non-transitory computer readable storage medium storing at least one computer program comprising instructions that, when executed by at least one processor, cause the at least one processor to perform operations for a user equipment (UE), the operations comprising:

based on a Packet Data Convergence Protocol (PDCP) protocol data unit (PDU) being received from a lower layer, determining a COUNT value of the received PDCP PDU;

performing an integrity verification for the received PDCP PDU based on the COUNT value;

based on the integrity verification of the received PDCP PDU succeeding and based on at least one PDCP PDU with the COUNT value having been received before, discarding the received PDCP PDU; and based on the integrity verification of the received PDCP PDU failing, discarding the received PDCP PDU and considering the received PDCP PDU as not received.

* * * * *